United States Patent [19]

Inabe et al.

[11] Patent Number: 4,920,816
[45] Date of Patent: May 1, 1990

[54] ACTUATOR WITH A CLUTCH MECHANISM

[75] Inventors: Shinya Inabe, Kawasaki; Ko Hirato, Yamato, both of Japan

[73] Assignee: Niles Parts Co., Ltd., Tokyo, Japan

[21] Appl. No.: 227,341

[22] Filed: Aug. 2, 1988

[30] Foreign Application Priority Data

Apr. 22, 1988 [JP] Japan .................................. 63-99684

[51] Int. Cl.$^5$ .......................... F16H 1/20; F16D 19/00
[52] U.S. Cl. ...................... 74/424.8 A; 74/424.8 VA; 192/93 C
[58] Field of Search ................ 74/424.8 A, 424.8 VA; 192/93 C

[56] References Cited

U.S. PATENT DOCUMENTS

| 4,125,049 | 11/1978 | Price, Jr. ................... 74/424.8 A X |
| 4,317,384 | 3/1982 | Calvin et al. .................. 74/424.8 A |
| 4,322,022 | 3/1982 | Bergman ..................... 74/424.8 A X |
| 4,367,805 | 1/1983 | Totani et al. ........................ 180/179 |
| 4,429,592 | 2/1984 | Stevenson ................... 74/424.8 A X |

FOREIGN PATENT DOCUMENTS 5675935 6/1981 Japan .

Primary Examiner—Leslie Braun
Assistant Examiner—Janice E. Chartoff
Attorney, Agent, or Firm—Ronald P. Kananen

[57] ABSTRACT

There is disclosed an actuator with a clutch mechanism in which a shaft device for operating an external mechanism is formed with threads thereon so as to be engaged with or disengaged from threads at inner surfaces of a plurality of collet type chuck members. The collet type chuck members are fitted into a member having outer teeth thereon, a line of magnetic force of an electromagnetic solenoid selectively acts upon pull-wedge members outside the collet type chuck members, whereby the collet type chuck members are engaged with or disengaged from the threads of the shaft device, and in the engaged condition, the member having outer teeth thereon is driven to rotate by a driving device, whereby the shaft device inside the member having outer teeth thereon is caused to be moved back and forth in a linear movement.

15 Claims, 3 Drawing Sheets

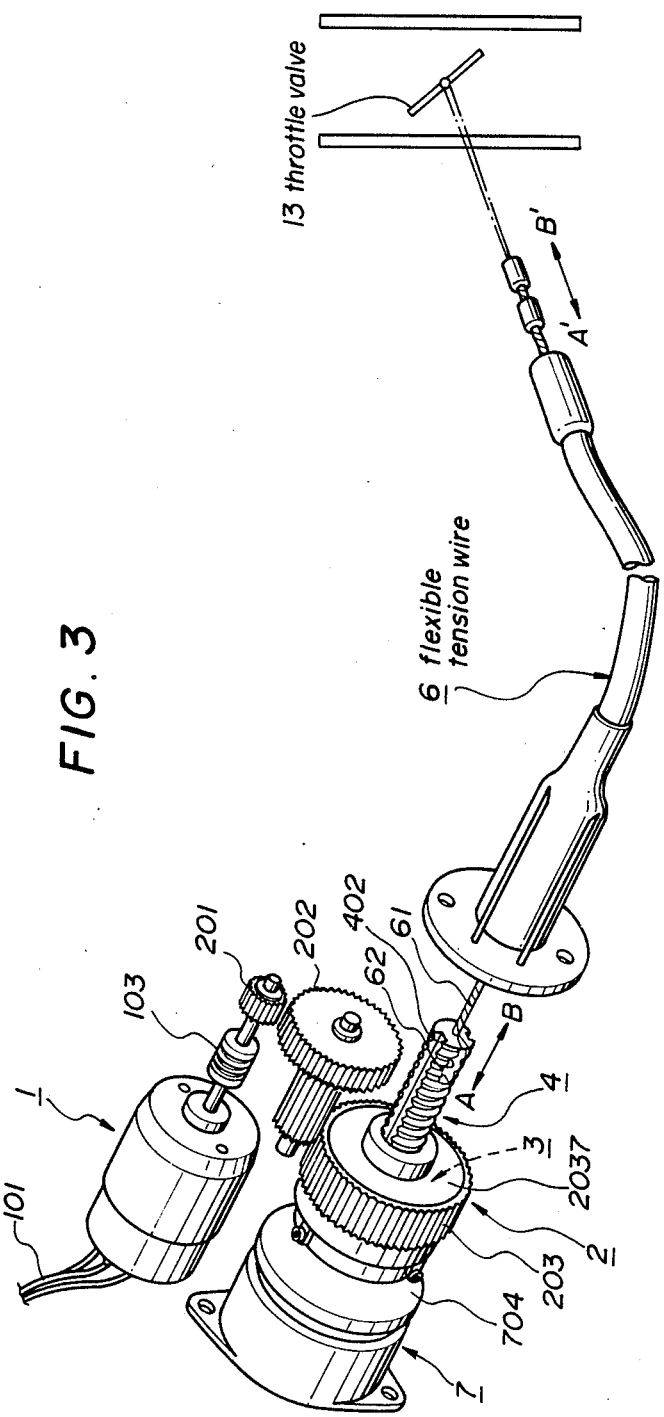

4,920,816

ACTUATOR WITH A CLUTCH MECHANISM

BACKGROUND OF THE INVENTION

Field of the Invention

This invention relates to an improvement of an actuator with a clutch mechanism or driving an external mechanism such as a throttle valve of a vehicle having, for example, an automatic speed control device (hereinafter merely called an "ASCD") by using a driving source such as a motor or the like.

As a conventional type of technology, there is, for example, a system disclosed in Laid-Open Japanese Patent No. 56-75935. This type of prior art relates to an ASCD, wherein it is disclosed that an electromagnetic clutch is installed between an operating system for an accelerator pedal and a servo mechanism for driving the accelerator pedal, the electromagnetic clutch having a clutch plate supported between a shaft and a leaf spring, and an excitation part positioned with clearance against the clutch plate and integrally moved with the shaft of a worm gear.

The electromagnetic clutch installed in the conventional device requires that the clutch plate be strongly attracted by an energization part in order to transmit a sufficient torque generated by a servo-motor to an operating system for an accelerator pedal, thereby necessitating an energization part of a large size. Furthermore, in the prior art, the gear part and the clutch part for transmitting torque from a servo-motor were separate and are separated at their horizontal positions; and a wide space is required for installing the gear portion and the clutch portion, resulting in a large-sized device. In the prior art, there were many component elements, and they were also expensive.

Summary of the Invention

In order to overcome the problems described above, it is an object of the present invention to provide an actuator having a clutch device in which a gear mechanism and a clutch mechanism are integrally arranged in a compact form to make a small-sized unit and at the same time, when the clutch device is operated, a rod is engaged with a chuck part to eliminate a poor rate of transmission torque caused by a sliding action or the like.

As means for accomplishing this object, the present invention provides an actuator having a clutch device in which a rod for driving an external mechanism is connected to an output shaft of a driving source through a gear mechanism and a clutch mechanism, wherein the gear mechanism includes a hollow cylinder, and the clutch mechanism is installed within the hollow cylinder to engage the rod.

The actuator having the clutch device constructed in accordance with the present invention operates as follows. When the gear mechanism is not operated, a chuck in the clutch mechanism is disengaged from the rod, and torque is not transmitted from the driving source through the gear mechanism, so that the external mechanism is not driven. When the gear mechanism is operated, the chuck is engaged with the rod, and the torque from the driving source is transmitted to the external mechanism through the clutch mechanism and the rod.

BRIEF DESCRIPTION OF THE DRAWINGS

The accompanying drawings illustrate the preferred the present invention, wherein

FIG. 3 is a perspective view showing a flexible tension wire connected to the actuator shown in FIG. 1.

DETAILED DESCRIPTION OF THE PREFERRED EMBODIMENT

Figure 2:
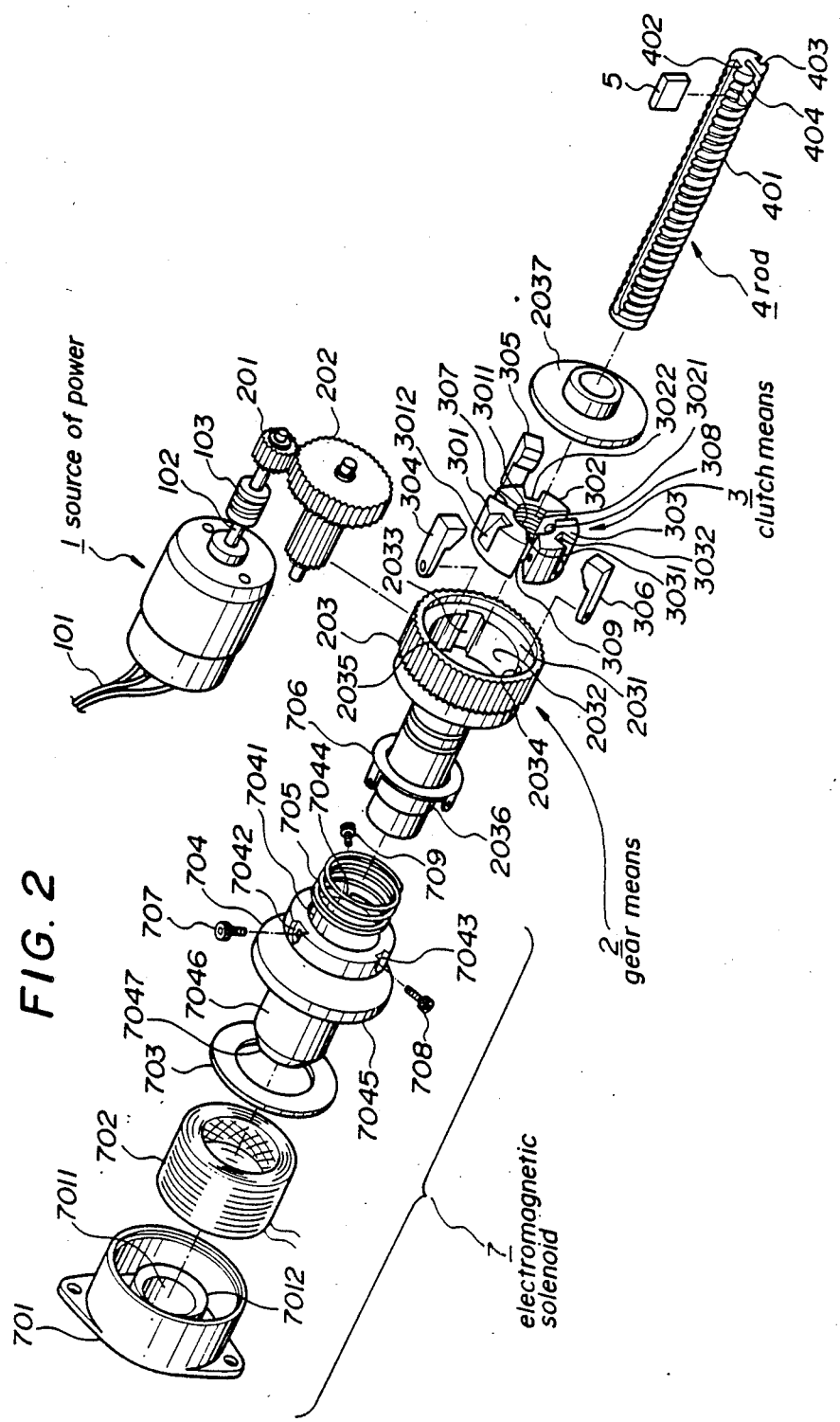
FIG. 2 is an exploded perspective view showing the actuator illustrated in FIG. 1.

As can be seen from FIGS. 2 and 3, a preferred embodiment of an actuator according to the present invention includes a clutch device which is suitable for use in a case in connection with the throttle valve of a vehicle having an ASCD installed thereon, wherein a reference numeral 1 is a source of power, such as a motor or the like, 2 is a gear mechanism, 3 is a clutch mechanism and 4 is a rod.

A DC motor is used as the source of power 1, which rotates in normal or reverse direction in response to the energizing direction of an excitation current. The source of power 1 is connected to an external circuit through electric wires 101 and to the gear mechanism 2 through a rotary shaft 102. That is, the source of power 1 is connected through the electric wires 101 to an ASCD circuit (not shown) and a device for detecting a position of the rod 4 to be described later, and to the gear mechanism 2 through the rotary shaft 102 and a resilient coupling 3.

The gear mechanism 2 comprises a motor gear 201, a drive gear 202 and a clutch gear 203. The gear mechanism reduces the rotational speed of the source of power 1 under a desired gear ratio and converts it into a high torque, thereafter transmitting the high torque to a subsequent clutch mechanism 3. It should be noted that the clutch gear 203 is formed with a hollow cylinder 2031 at its center, and the hollow cylinder 2031 has first to third chuck parts 301, 302, 303 of the clutch mechanism 3 installed therein, as will be describe later. The clutch gear 203 has through-holes or slots 2033, 2034, 2035 through which first to third pull wedges 304, 305, and 306, which will be described later, are slidably inserted, and the clutch gear 203 also has a hollow shaft 2036.

The clutch mechanism 3 comprises, in addition to the above-described first to third chuck parts 301 to 303, the first to third pull wedges 304 to 306 and first to third oil springs 307, 308 and 309. The chuck parts 301 to 303 are formed with threaded portions 3011, 3021 and 3031, respectively, to be engaged with the rod 4, through which will be described later. The first to third coil springs 307 to 309 are held between the opposing surfaces of each of the chuck parts 301 to 303, and the coil springs 307 to 309 act to push each of the chuck parts 301 to 303 against an inner wall 2032 of the hollow cylinder 2031 when each of the chuck parts 301 to 303 is installed in the hollow cylinder 2031 of the clutch gear 203. An outside portion of each of the chuck parts 301 to 303 is formed with tapered surfaces 3012, 3022 and 3032, respectively, which contact each of the pull wedges 304 to 306.

The rod 4 has at its outer circumference a threaded portion 401 having the same pitch as that of the threaded parts 3011 to 3031 of each of the chuck parts 301 to 303 described above. The rod 4 is formed with grooves 401 and 403 along substantially the entire axial length of the rod 4 through which a key 5 slides for preventing rotation of the rod 4. Furthermore, a hook part 404 is formed on one end of the rod 4 for transmitting tension through a flexible tension wire 6 to a throttle valve 13, and the hook part 404 has an engaging piece 62 fastened to an end part of a wire portion 61 of the flexible tension wire 6.

The actuator having the clutch mechanism has an electromagnetic solenoid 7 which operates the clutch means 3. The electromagnetic solenoid 7 is composed of a yoke 701, an electromagnetic coil 702, a plate 703 and a plunger 704. The plunger 704 is made of a ferromagnetic material and comprises: a cylinder part 7041 in which the shaft part 2036 of the clutch gear 203 is slidably inserted or fitted and in which a coil spring 705 is fitted; threaded holes 7042, 7043 and 7044 for fastening each of the pull wedges 304 to 306 inserted into the through-holes 2033 to 2035 of the clutch gear 203 by screws 707 to 709 together with a spacer 706; a flange 7045; a plunger body 7046 to be retracted into the yoke 701 under the action of a line of magnetic force generated by the coil 702; and a conical part 7047 formed at an extremity end of the plunger body 7046. The yoke 701 and the plate 703 are formed of ferromagnetic material, and the coil 702 is stored in the yoke 701.

At the center of the yoke 701 is provided a hole 7011 through which the rod 4 reciprocates, and further around the center is provided a receptacle 7012 of the yoke 701 which is formed in a conical shape for receiving the conical part 7047.

In the drawings: 2037 is a ring shaft for holding the clutch mechanism 3 within the hollow cylinder 2031 of the clutch gear 203; 8 and 9 designate bearings; 10 indicates a sensor gear connected to a potentiometer (not shown) for sensing the position of the rod 4; and 11 and 12 denote cases.

The operation of the actuator having the clutch mechanism composed of the above-mentioned construction will be described. The actuator having the clutch mechanism of the preferred embodiment is mounted in a vehicle having an ASCD as described above. The electromagnetic solenoid 7 and the source of power 1 are driven by a control signal from the ASCD circuit and, as is shown in FIG. 3, the rod 4 is operated in the direction of arrow A or arrow B.

The rod 4 is mechanically connected to the throttle valve 13 through the flexible tension wire 6 so that, for example, when the rod 4 is operated in the direction A, the throttle valve 13 is opened and when the rod 4 is operated in the direction B, the throttle valve 13 is closed. Then, the vehicle speed is automatically maintained at a specified speed, for example, under the operation of the rod 4.

Figure 1:
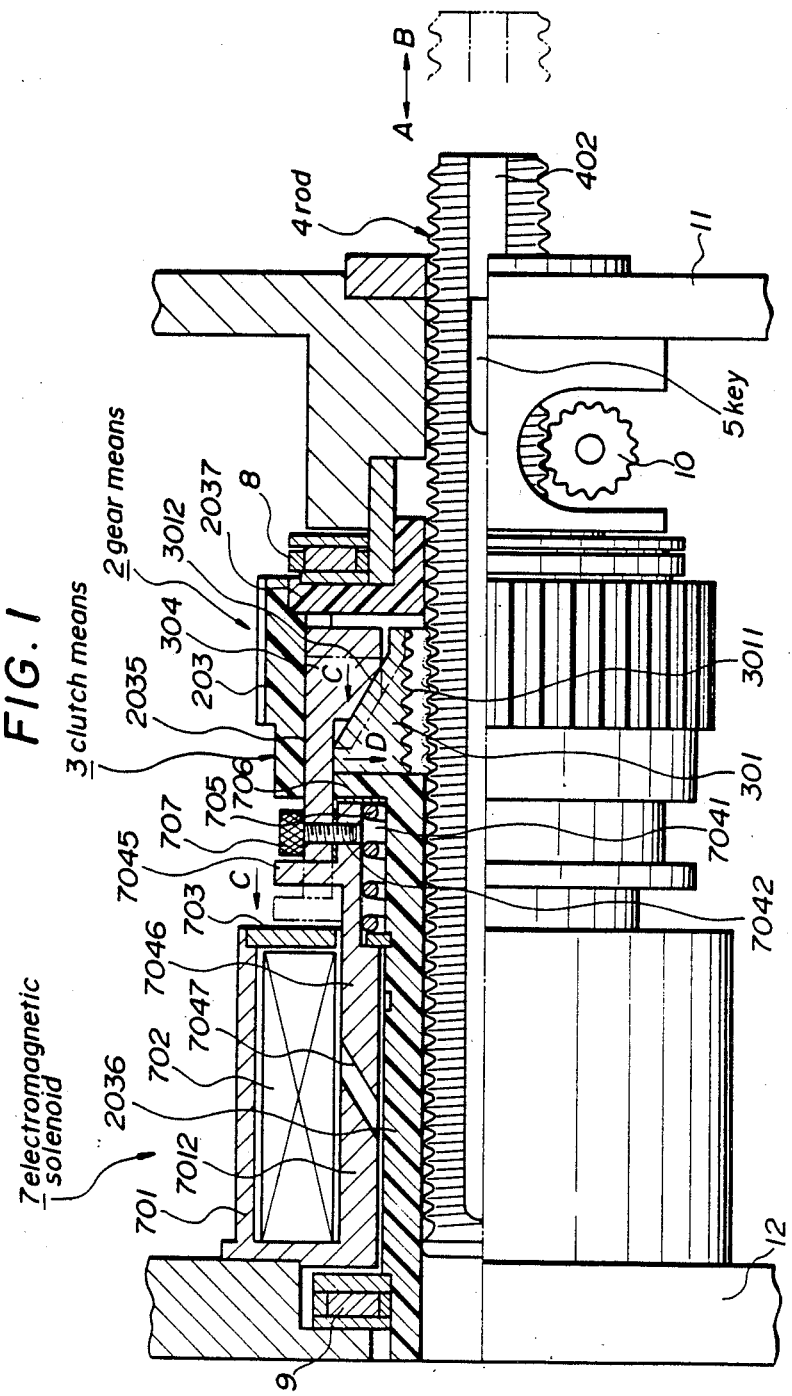
FIG. 1 is a sectional view showing a substantial part of the preferred embodiment of an actuator according to the present invention.

Operation of the rod 4 under the action of the electromagnetic solenoid 7 and the source of power 1 will be described in detail. At first, when the electromagnetic solenoid 7 and the source of power 1 are not operated, the clutch mechanism 3 is disengaged from the rod 4, and the rod 4 is moved in the direction of the arrow B under a recovering force of the throttle valve 13. When the electromagnetic solenoid 7 is operated, the plunger 704 is retracted into the yoke 701 in the direction indicated by the arrow C in FIG. 1 under an energization of the electromagnetic coil 702.

The plunger 704 has each of the pull wedges 304 to 306 of the clutch mechanism 3 fastened to it with screws, and a retraction of the plunger 704 in the direction of the arrow C causes each of the pull wedges 304 to 306 to be moved in the direction of arrow C. Due to this fact, the pull wedges 304 to 306 depress the tapered surfaces 3012 to 3032 of each of the chuck parts 301 to 303, resulting in the motion of each of the chuck parts 301 to 303 in the direction of arrow D shown in FIG. 1 against the resilient force of each of the coil springs 307 to 309, that is, in a direction toward the rod 4, and the threaded parts 3011 to 3031 formed inside each of the chuck parts 301 to 303 mesh with the threaded part 401 of the rod 4.

When the source of power 1 is operated under this condition, its rotation is transmitted to the clutch gear 203 through the coupling 103, the motor gear 201 and the drive gear 202, and each of the chuck parts 301 to 303 of the clutch mechanism 3 is rotated while being meshed with the rod 4. Thus, the rod 4 is moved in the direction of the arrow A or the direction of the arrow B shown in FIGS. 1 and 2 under the rotation of the chuck parts 301 to 303. The moving direction of the rod 4 is determined by the rotational direction of the source of power 1. Speed of rotation, stopping and rotational direction of the source of power 1 are controlled by the ASCD circuit in response to a vehicle speed set by a driver with an ASCD switch and to an operating position of the rod 4. In other words, the ASCD circuit detects an operating position of rod 4 when the ASCD is set to a normal running speed mode, and at the same time, the degree of opening of the throttle valve 13 is controlled under the operation of the rod 4, and then the circuit compares the actual vehicle speed with a predetermined vehicle speed, a feed-back operation is repeated in response to inputs from the vehicle speed sensor (not shown) and the sensor gear 10 and the like in a manner such that both the predetermined and actual vehicle speeds may be maintained constant within a desired allowable range so as to control the operating position of the rod 4.

The present invention is not limited to the above-described preferred embodiment, and various changes and modifications may be made without departing from the spirit and scope of the present invention. For example, although in the abovedescribed preferred embodiment, it is illustrated that the threaded parts 3011 to 3031 are formed inside each of the chuck parts 301 to 303 of the clutch mechanism 3 and at the same time the threaded part 401 having the same pitch as that of the former is formed in the opposing rod 4 so as to form a clutch mechanism, and the rotational movement from the source of power 1 is converted into a linear movement of the rod 4 through the clutch mechanism 3, the threaded part 401 and the rotation preventive key 5 of the rod 4 can be eliminated and in place of them, a gear or a crank mechanism or the like can be connected to the rod 4 so that a merely rotational movement is transmitted between the rod 4 and the clutch mechanism 3. As another example, although in the above-described preferred embodiment, the operating position of the rod 4 is detected bY the gear sensor and the potentiometer, the position of the rod 4 may be detected under a binary coding system by using other position sensors, for example, a magnetic sensing device using a Hall element, a switch type sensing device using a microswitch or a pulse switch, or an optional reading device for reading a bar code or a mosaic pattern which is printed on the rod 4.

In the present invention, the actuator having a clutch device, in which a rod for driving an external mechanism is connected to an output shaft of a source of power through a gear mechanism and a clutch mechanism, is constructed such that a hollow cylinder is formed in the gear mechanism, and the clutch mechanism is installed in the hollow cylinder to engage with the rod. This structure has the advantages that the rod can positivelY be held through the chuck parts of the clutch mechanism; poor transmission of torque caused by a sliding movement at the clutch mechanism can be completelY eliminated; the gear mechanism and the clutch mechanism can be enclosed and made integral with each other, and it provides superior results in fulfilling the requirements of small size and high torque for an actuator to be installed in a vehicle, for example. According to the above-described preferred embodiment, it has a specific advantage that the chuck parts of the clutch mechanism act as a clutch as well as performing the function of converting a rotational movement into a linear movement. In the case that the actuator having the clutch mechanism of the present invention is applied to an automatic speed control device for a vehicle, it has the remarkable advantage that there is no slippage in the clutch, and response to a vehicle speed control is improved.

We claim:

1. An actuator for driving an external mechanism, comprising:
   a hollow member; means for rotating said hollow member;
   a driving element extending into said hollow member, said element being connected to the external mechanism;
   clutch means mounted in said hollow member for selectively moving said driving element in response to rotation of said hollow member;
   a hollow spindle portion for supporting said driving element; and
   a solenoid mounted on said hollow spindle portion for driving said clutch means;
   whereby said driving element drives said external mechanism.

2. The actuator according to claim 1, wherein said hollow member has gear teeth, and said rotating means comprises a toothed element engaging said gear teeth.

3. The actuator according to claim 1, wherein said rotating means comprises a motor.

4. The actuator according to claim 2, wherein said drive rotating means comprises a motor, said toothed element being drivingly connected to said motor.

5. The actuator according to claim 1, wherein said driving element has threads, and said clutch means comprises at least one clutch element having a thread portion and means for moving said thread portion into engagement with the threads of said driving element.

6. The actuator according to claim 5, further comprising means for preventing rotation of said driving element.

7. The actuator according to claim 5, wherein said clutch means comprises a plurality of clutch elements arcuately spaced around said driving element.

8. The actuator according to claim 7, wherein said clutch means further comprises wedges positioned between and engaging said clutch elements and said hollow member, said wedges being movably mounted between first positions, in which the thread portions of said clutch elements are out of engagement with the threads of said driving element, and second positions, in which the thread portions of said clutch elements are in engagement with the threads of said driving element.

9. The actuator according to claim 8, wherein said clutch elements have tapered surfaces, and said wedges engage said tapered surfaces.

10. The actuator according to claim 8, wherein slots are defined in said hollow member, and said wedges are slidably movable in said slots.

11. The actuator according to claim 8, wherein said solenoid includes plunger means for reciprocating said wedges between said first and second positions.

12. The actuator according to claim 11, wherein said solenoid includes a plunger, and said wedges are connected to said plunger.

13. The actuator according to claim 6, wherein said means for preventing rotation comprises an axial groove in said driving element and a key in said groove.

14. An actuator for driving an external mechanism, comprising
   a hollow member;
   means for rotating said hollow member;
   a threaded driving element extending into said hollow member;
   a hollow spindle portion for supporting said driving element;
   a plurality of clutch elements movably mounted within said hollow member for rotation with said hollow member, each said clutch element having a thread portion facing said threaded element;
   means including a solenoid for axially moving the thread portions of said clutch elements into engagement with the threaded element in response to actuation of said solenoid; said solenoid mounted on said hollow spindle portion;
   whereby said driving element drives said external mechanism.

15. An actuator for operating a throttle valve of a vehicle having an automatic speed control device, comprising:
   a hollow member;
   means for rotating said hollow member in response to a vehicle speed set by a driver;
   a driving element extending into said hollow member, said element being connected to the throttle valve;
   a hollow spindle portion for supporting said driving element;
   clutch means mounted in said hollow member for selectively moving said driving element in response to rotation of said hollow member;
   means including a solenoid for axially moving said clutch means into engagement with said driving element in response to actuation of said solenoid; and, whereby said driving element operates said throttle valve.

* * * * *